Patented Apr. 6, 1954

2,674,159

UNITED STATES PATENT OFFICE 2,674,159

PROCESS FOR THE MANUFACTURE OF LIGHT-POLARIZING SHEETS

Frederick J. Binda, Cambridge, Mass., assignor to Polaroid Corporation, Cambridge, Mass., a corporation of Delaware No Drawing. Application March 16, 1951, Serial No. 216,113

6 Claims. (Cl. 88—65)

This invention relates to a new and improved process for the manufacture of light-polarizing sheets.

Objects of the invention are to provide a process for the production, continuously, of mechanically supported, thin, highly efficient, light-polarizing sheets or films; to provide such a process wherein the light-polarizing sheet or film comprises essentially a material from the class consisting of the polyvinyl alcohols, the polyvinyl acetals and the polyvinyl ketals, and more specifically polyvinyl alcohol which is molecularly oriented and which contains, distributed adjacent at least one surface thereof, the oriented dehydration product of polyvinyl alcohol known as polyvinylene; and to provide such a process wherein the polarizing sheet is of excessive thinness, has been treated with a cross linker and with a buffer so as to be highly resistant to the action of heat, moisture and sunlight, and wherein the polarizing sheet is bonded, as by an autogenous bond, to a transparent, mechanically strong, plastic backing comprising, preferably, a cellulosic material.

Other objects of the invention are to provide a process of the character described wherein the successive steps may be rapidly and expeditiously performed on continuous sheet material, which process is cheap and easy to perform and which produces a highly efficient, extremely stable, backed, light-polarizing sheet of great tensile strength and which may be easily handled, shipped, manipulated and bonded to glass or other optical elements for use wherever light polarizers may be advantageously employed.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

Light polarizers which are employed in connection with the headlights of automotive vehicles, in systems utilizing light-polarizing materials for the reduction or elimination of headlight glare, are subjected to extreme temperature and humidity changes as well as to other conditions in use which require great strength and stability in the polarizing sheet. Such systems of headlight glare elimination now contemplate the use of headlights of 125 watts or even higher, and in operation such headlights develop a surface temperature in excess of 400° F. The light-polarizing materials which are employed in these systems must transmit as much as possible of the emitted beam, i. e., they must transmit a high percentage of the desired component and must also be highly efficient in extinguishing the undesired or absorbed component. This means, in effect, that the polarizers must be substantially free from isotropic stain and must be as thin as can be practicably employed. The wide temperature range to which such polarizers are subjected, i. e., from several degrees below zero to temperatures in excess of 400° F., and the weathering conditions to which they are subjected, compel the use of polarizing sheets of great stability and strength.

Polarizers which comprise oriented suspensions of the dichroic dehydration product of polyvinyl alcohol known as polyvinylene, in molecularly oriented films of polyvinyl alcohol, have been found preferable for use in headlight glare elimination systems and in other devices and optical systems where the polarizer is subjected to high temperatures, to wide temperature fluctuations and to extreme variations in humidity. Such polarizers are described generally in United States Patents No. 2,173,304, to Land and Rogers, which issued September 19, 1939, No. 2,255,940 to Rogers, which issued September 16, 1941, and No. 2,445,555 to Binda, which issued July 20, 1948. This invention relates to an improved process for the production of mechanically strengthened or backed polarizers of the type described in these patents and to such a process which is adapted for continuous operation with sheet materials and which results in a product of very great efficiency and strength. More specifically, this invention relates to the production of improved and mechanically strengthened polarizing sheets of the type specifically described in the patent to Binda, No. 2,445,555.

In the practice of the present invention, a thin sheet of a material from the class consisting of the polyvinyl alcohols, polyvinyl acetals and polyvinyl ketals, and more specifically a sheet of polyvinyl alcohol preferably of a thickness of the order of .0015 inch and of any desired length and width, for example thirty inches in width, is treated with an acid conversion catalyst, for example by passing the sheet over hydrochloric acid heated to approximately 140° F. The polyvinyl alcohol sheet is maintained a short distance, for example three or four inches, above the surface of the acid and the upper surface of the sheet is masked or shielded so as to prevent contact thereof with vapors rising from the acid solution. The under surface of the sheet is exposed to the acid vapors for a period of approximately one minute and during this period is warmed by a heated cover or equivalent means positioned closely adjacent the sheet and maintained at a temperature of approximately 130° F. The extent of penetration of the acid fumes into the polyvinyl alcohol sheet may be controlled by altering the temperature of the acid bath, altering the time of exposure of the polyvinyl alcohol sheet to the bath and/or altering the temperature of the heating element positioned adjacent the sheet. With the conditions specified above, the acid vapor penetrates appreciably into the sheet but does not reach the protected upper surface, so that in the conversion step hereinafter described one surface of the sheet remains unconverted. The acid fumes act as a catalyst for the subsequent conversion of a portion of the sheet to the dehydration product of polyvinyl alcohol known as polyvinylene.

After fuming, as described above, the polyvinyl alcohol sheet passes through a heating oven where it is subjected to a temperature of from 325° F. to 360° F. for about one-half minute and simultaneously extended or stretched to about five times its initial unit length. This stretch is accompanied by a reduction in width of the sheet by approximately one-third and a reduction in thickness by approximately two-thirds, i. e., to about .0005 inch, and results in a high degree of molecular orientation of the sheet. The stretched sheet, while still self-supporting and manageable, is relatively fragile and easily torn. While the sheet is being stretched, the catalyzed portion is converted into the dehydration product of polyvinyl alcohol known as polyvinylene. The concentration of the oriented polyvinylene is greatest adjacent that surface of the sheet which was subjected to the fumes of the acid catalyst and diminishes progressively as the sheet is penetrated.

The portion of the sheet adjacent the uncatalyzed surface remains unconverted polyvinyl alcohol. This is important for two reasons. At the next step in the process the sheet is backed or laminated to a supporting plastic sheet of high tensile strength which gives mechanical strength to the finished product. Because of the stresses to which the polarizing film is subjected by great changes in temperature and humidity, the bond to the supporting backing must be excellent and a preferred bond can best be obtained if the surface of the sheet which is affixed to the backing remains free from polyvinylene. Moreover, the backed sheet is subsequently treated with a solution which stabilizes the polarizing film, and it has been found that if conversion of the polyvinyl alcohol to polyvinylene is permitted throughout the entire thickness of the polarizing layer, stabilization of that portion of the polarizing layer adjacent the backing sheet can be effected only with difficulty. The process may be greatly expedited and an improved product obtained if conversion of the polyvinyl alcohol to polyvinylene is limited in the manner heretofore described to the exposed portions of the backed polarizing layer.

The optical properties of the finished polarizer may be controlled by controlling the temperature of the oven in which the conversion and stretching takes place and the time during which the catalyzed sheet is subjected to the oven heat. If the temperature of the oven is maintained at about 325° F. and the other conditions of the process remain constant, as heretofore specified, the polarizer produced will transmit approximately 38% of unpolarized light incident thereon, and two sheets of the polarizer in crossed position will transmit approximately .025% of the incident light. If the temperature of the oven is maintained at about 360° F. and the other conditions remain constant, a single sheet of the polarizing material will transmit approximately 32% of the incident unpolarized light, and two crossed sheets will transmit no more than .01% of the incident light. It is thus apparent that if a high transmission polarizer is essential a relatively low oven temperature will produce the desired result, while if a somewhat lower transmission polarizer is required with a higher cut-off the higher oven temperature should be employed.

After leaving the oven the stretched and converted sheet, still held under tension, is passed between laminating rolls where it is brought into contact with a transparent plastic backing which may preferably comprise a sheet of a cellulosic plastic, and more specifically cellulose acetate butyrate, of the same width as the polarizing sheet and of any desired thickness, for example from .005 inch to .015 inch or even thicker, depending upon the use to which the finished product is to be put. That surface of the cellulose acetate butyrate sheet which comes into contact with the polarizing film is preferably provided with a subcoat which may comprise a mixture of cellulose nitrate and polyvinyl alcohol and which improves the resulting bond. Adhesion is effected between the unconverted polyvinyl alcohol surface of the polarizing sheet and the subcoated surface of the cellulosic backing by pressure in the presence of water or a dilute solution, for example a 4% solution, of chromic nitrate in water. The bond is obtained at room temperature and may be said to be an autogenous bond.

The backed sheet is then treated with a solution comprising a cross linker for polyvinyl alcohol, such for example as boric acid, and a buffer, such as borax, sodium hydroxide or potassium hydroxide. The cross linker acts to improve the moisture resistance of the polarizing film and its resistance to high temperatures, and the buffer acts also to improve its resistance to high temperatures and stabilizes the film against bleaching. A typical bath for this treatment may comprise a 9% solution of boric acid containing 2½% of borax by weight, and the backed sheet of light-polarizing material is preferably floated upon the surface of this solution with the converted polyvinyl alcohol in contact with the solution. The solution is heated, preferably to a temperature of from 190° F. to 205° F. and the sheet is preferably held in contact with the solution for a short period, for example approximately one-half minute. If the temperature of the boric acid bath is maintained appreciably below 190° F., other conditions remaining constant, the resulting color of the polarizing film is poor and if the temperature is maintained above 205° F. minute imperfections, such as pin holes, in the polarizing sheet tend to become greatly enlarged. The boric acid treatment serves also to wash out of the sheet acid catalyst remaining from the conversion step. The temperature of the boric acid bath is altered within the indicated limits in accordance with changes in density of the polarizing layer. The higher temperatures are employed with the more dense polarizers. As the sheet comes from the bath it is dried by passing it across a high vacuum wiper and then further dried by heating to a temperature of approximately 225° F. for a period of about 45 seconds.

The resulting product is a backed light-polarizing sheet or film of high efficiency, great stability and useful even under conditions of wide temperature fluctuations and excessive humidity changes. The sheet is stable to temperatures of the order of 400° F., to ultraviolet radiation, to rapid fluctuations in temperature and to rapid changes in humidity from substantial saturation to substantial dryness. The backing and the excellent bond obtained between it and the polarizing sheet serve to prevent shrinkage of the polarizer and eliminate the many tears and fractures which heretofore have impaired the operation of excessively thin polarizing sheets of this type.

Since certain changes may be made in the above process without departing from the scope of the invention herein involved, it is intended that all matter contained in the above description shall be interpreted as illustrative and not in a limiting sense.

What is claimed is:

1. In a process for the manufacture of backed light-polarizing sheets of high efficiency, great stability and strength, the steps comprising treating one surface only of a thin sheet of a material from the class consisting of the polyvinyl alcohols, polyvinyl acetals and polyvinyl ketals with an acid dehydration catalyst whereby the other surface and the portion of said sheet thereadjacent remain substantially uncatalyzed, thereafter heating said catalyzed sheet to form polyvinylene in the catalyzed portion thereof and simultaneously stretching said sheet to orient the molecules thereof, bonding to the uncatalyzed surface of said sheet, while maintaining the same under tension, a light-transmitting backing comprising a sheet of a cellulosic plastic subcoated with an adhesive comprising polyvinyl alcohol, treating said backed polarizing sheet with a hot solution comprising boric acid and a buffer from the class consisting of borax, sodium hydroxide and potassium hydroxide, and drying said sheet.

2. The process of claim 1 wherein the backing comprises cellulose acetate butyrate and the catalyzed sheet comprises polyvinyl alcohol.

3. The process of claim 1 wherein the catalyzed sheet is heated to between 325° F. and 360° F. and is stretched to about five times its initial length.

4. The process of claim 1 wherein the catalyzed sheet comprises polyvinyl alcohol, the buffer is borax and the solution comprising the buffer and boric acid is heated to between 190° F. and 205° F.

5. The process of claim 1 wherein the catalyzed sheet comprises polyvinyl alcohol and is reduced in thickness by stretching by about two-thirds and to a thickness of about .0005 inch.

6. The process of claim 1 wherein the conversion catalyst penetrates only that portion of the catalyzed sheet adjacent the treated surface thereof and wherein substantially all catalyst remaining in said sheet after stretching is removed by the solution comprising boric acid.

References Cited in the file of this patent

UNITED STATES PATENTS

| Number | Name | Date |
| --- | --- | --- |
| 2,173,304 | Land et al. | Sept. 19, 1939 |
| 2,255,940 | Rogers | Sept. 16, 1941 |
| 2,263,249 | Rogers | Nov. 18, 1941 |
| 2,356,250 | Land | Aug. 22, 1944 |
| 2,398,506 | Rogers | Apr. 16, 1946 |
| 2,423,503 | Land et al. | July 8, 1947 |
| 2,445,555 | Binda | July 20, 1948 |
| 2,445,579 | Hyman | July 20, 1948 |
| 2,481,189 | Barnes | Sept. 6, 1949 |